United States Patent
Otomi et al.

(10) Patent No.: US 10,962,007 B2
(45) Date of Patent: *Mar. 30, 2021

(54) GAS EJECTION APPARATUS

(71) Applicant: DENSO TEN Limited, Kobe (JP)

(72) Inventors: Masashi Otomi, Kobe (JP); Toru Yamaguchi, Kobe (JP); Minoru Hirashima, Kobe (JP); Mitsuhiro Tsukazaki, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 296 days.

This patent is subject to a terminal disclaimer.

(21) Appl. No.: 16/151,858

(22) Filed: Oct. 4, 2018

(65) Prior Publication Data
US 2019/0145413 A1 May 16, 2019

(30) Foreign Application Priority Data
Nov. 14, 2017 (JP) .............................. JP2017-219511

(51) Int. Cl.
| | |
|---|---|
| *F04C 28/06* | (2006.01) |
| *B60S 1/56* | (2006.01) |
| *F04C 21/00* | (2006.01) |
| *F04C 9/00* | (2006.01) |
| *F04C 29/00* | (2006.01) |
| *F04B 49/06* | (2006.01) |
| *F01C 9/00* | (2006.01) |
| *B60S 1/54* | (2006.01) |

(52) U.S. Cl.
CPC .............. *F04C 28/06* (2013.01); *B60S 1/56* (2013.01); *F01C 9/002* (2013.01); *F04B 49/065* (2013.01); *F04C 9/00* (2013.01); *F04C 9/002* (2013.01); *F04C 21/00* (2013.01); *F04C 21/002* (2013.01); *F04C 29/0085* (2013.01); *B60S 1/54* (2013.01); *F04C 29/005* (2013.01); *F04C 2220/28* (2013.01); *F04C 2240/81* (2013.01)

(58) Field of Classification Search
CPC .... F04C 9/002; F04C 21/002; F04C 29/0085; F04C 21/00; F04C 29/005; F04C 2220/28; F04C 9/00; F04C 28/06; F01C 9/002; F04B 49/065; B60S 1/56; B60S 1/54

See application file for complete search history.

(56) References Cited

U.S. PATENT DOCUMENTS

| | | | | |
|---|---|---|---|---|
| 10,459,219 | B2* | 10/2019 | Otomi | ................ G02B 27/0006 |
| 10,704,551 | B2* | 7/2020 | Otomi | .................. F04C 21/002 |
| 10,717,418 | B2* | 7/2020 | Yamanaka | ......... G02B 27/0006 |

FOREIGN PATENT DOCUMENTS

| | | |
|---|---|---|
| JP | 2009-220719 A | 10/2009 |
| JP | 2017-119480 A | 7/2017 |
| JP | 2018-084178 A | 5/2018 |

* cited by examiner

*Primary Examiner* — Peter J Bertheaud
(74) *Attorney, Agent, or Firm* — Oliff PLC

(57) ABSTRACT

A gas ejection apparatus ejects gas using a compressor that compresses the gas by a rotating body inside a cylinder, and includes a detector and a microcomputer. The detector detects a position of the rotating body inside the cylinder based on positions of gears which are coupled to the rotating body. When the microcomputer receives an ejection instruction, the microcomputer controls intake and exhaust of the compressor according to detection results of the detector, and causes the compressor to wait in an intake completion state upon completion of ejection of the gas that was performed in response to the ejection instruction.

12 Claims, 6 Drawing Sheets

GAS EJECTION APPARATUS

BACKGROUND OF THE INVENTION

Field of the Invention

The invention relates to a gas ejection apparatus and a gas ejection method.

Description of the Background Art

Conventionally, there is a gas ejection apparatus that ejects compressed gas. The gas ejection apparatus, for example, ejects gas onto a lens of a camera installed on an exterior of a vehicle and removes attached substances from the lens.

However, in a conventional technology, in a case where the gas ejection apparatus is previously stopped in an exhaust state, in some cases, it is impossible to immediately eject the gas at a desired timing after the gas ejection apparatus is activated.

SUMMARY OF THE INVENTION

According to one aspect of the invention, a gas ejection apparatus ejects gas using a compressor that compresses the gas by a rotating body inside a cylinder. The gas ejection apparatus includes a detector that detects a position of the rotating body inside the cylinder based on positions of gears which are coupled to the rotating body. The gas ejection apparatus also includes a microcomputer that controls intake and exhaust of the compressor according to detection results of the detector when receiving an ejection instruction. The microcomputer causes the compressor to wait in an intake completion state upon completion of ejection of the gas that was performed in response to the ejection instruction.

It is possible to immediately eject the gas at a desired timing.

According to another aspect of the invention, when the microcomputer receives the ejection instruction and the compressor is in an intake state, the microcomputer controls the compressor to be moved to the intake completion state after passing through an exhaust state.

It is possible to eject the gas at the maximum efficiency when detecting a next ejection instruction.

Therefore, an object of the invention is to provide the gas ejection apparatus that can immediately eject the gas at the desired timing and a gas ejection method.

These and other objects, features, aspects and advantages of the invention will become more apparent from the following detailed description of the invention when taken in conjunction with the accompanying drawings.

DESCRIPTION OF THE EMBODIMENTS

Embodiments of a gas ejection apparatus and a gas ejection method will be described with reference to attached drawings. This invention is not limited by the embodiments described below.

Figure 1:
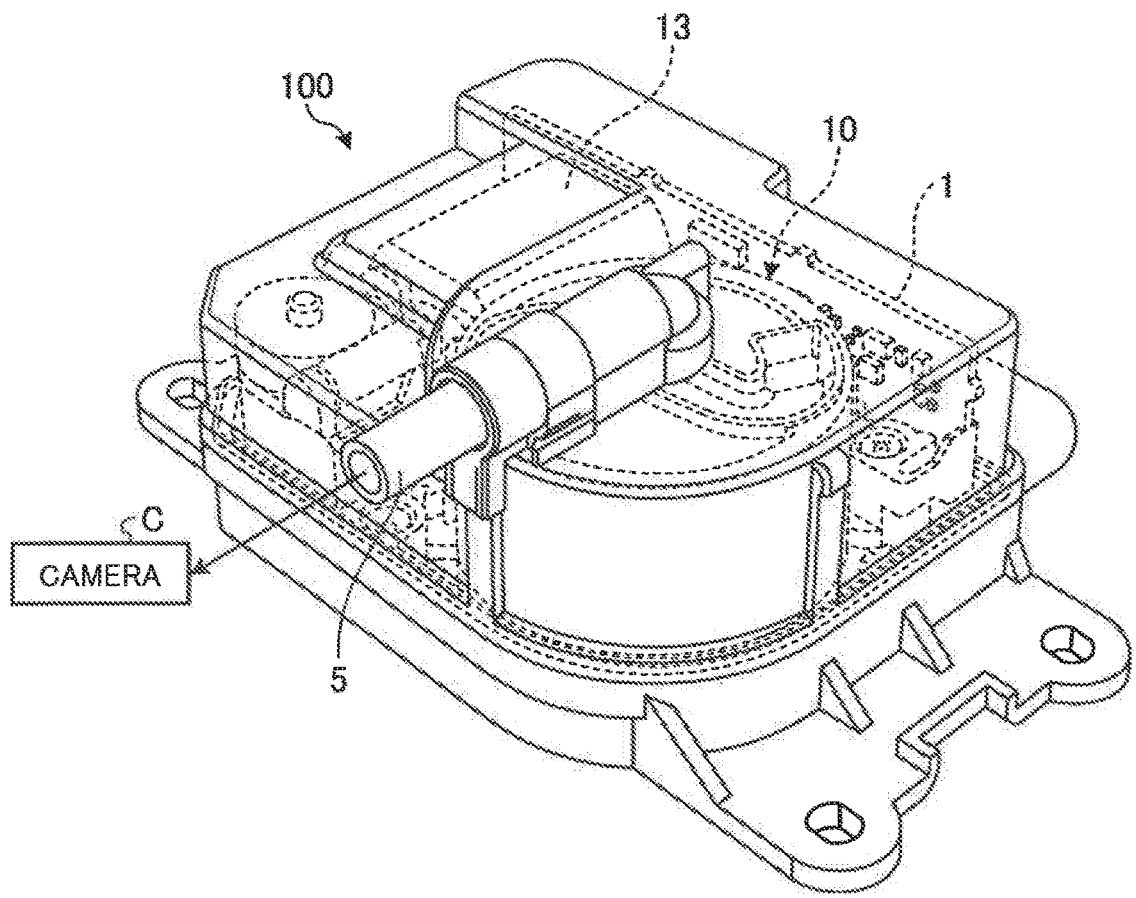
FIG. 1 is a perspective transparent view of a gas ejection apparatus.

First, an outline of the gas ejection apparatus according to this embodiment will be described below with reference to FIG. 1. FIG. 1 is a perspective transparent view of the gas ejection apparatus 100. A case in which the gas ejection apparatus 100 ejects gas onto a lens of a camera C and removes attached substances such as rain drops attached to the lens of the camera C that is an ejection target device will be described below.

As shown in FIG. 1, the gas ejection apparatus 100 includes a controller 1, an output portion 5, a compressor 10 and a drive portion 13. The controller 1 is a microcomputer having a CPU and a memory and the like and controls the drive portion 13 so as to cause the compressor to operate. The controller 1 will be described later in detail with reference to FIG. 6.

The compressor 10 has a rotary gas compression mechanism. The compressor 10 operates according to driving of the drive portion 13 described later and compresses intake gas and ejects the gas onto the camera C from the output portion 5. The gas compression mechanism of the compressor 10 will be described later with reference to FIG. 2.

The drive portion 13 includes a drive source such as a motor and drives the compressor 10 according to control by the controller 1. That is, the drive portion 13 functions as a power source of the compressor 10. The drive portion 13 will be described later in detail with reference to FIG. 3.

Figure 2:
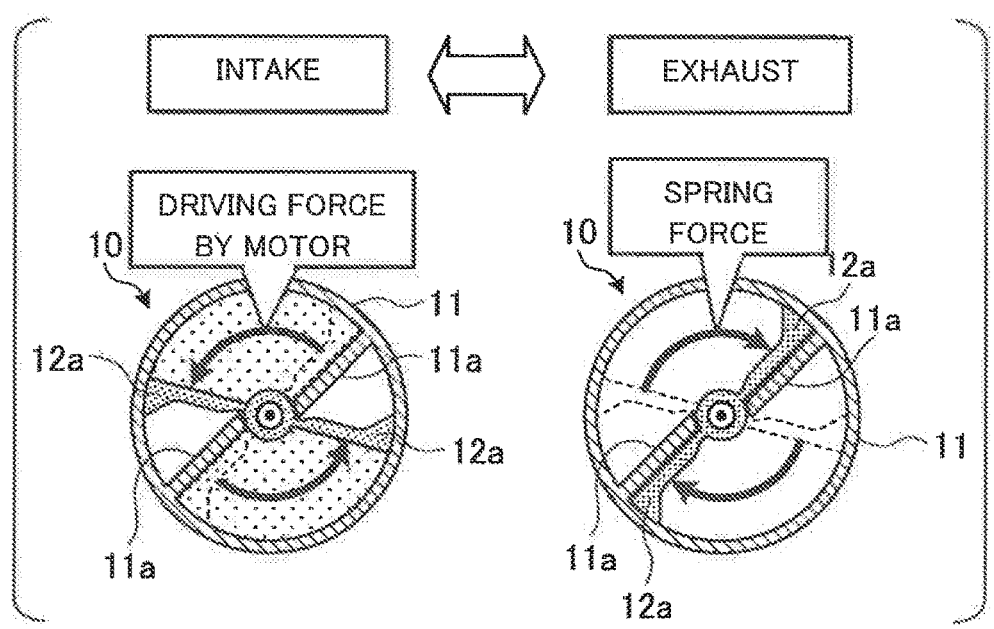
FIG. 2 is an operation explanatory diagram of a compressor.
Figure 3:
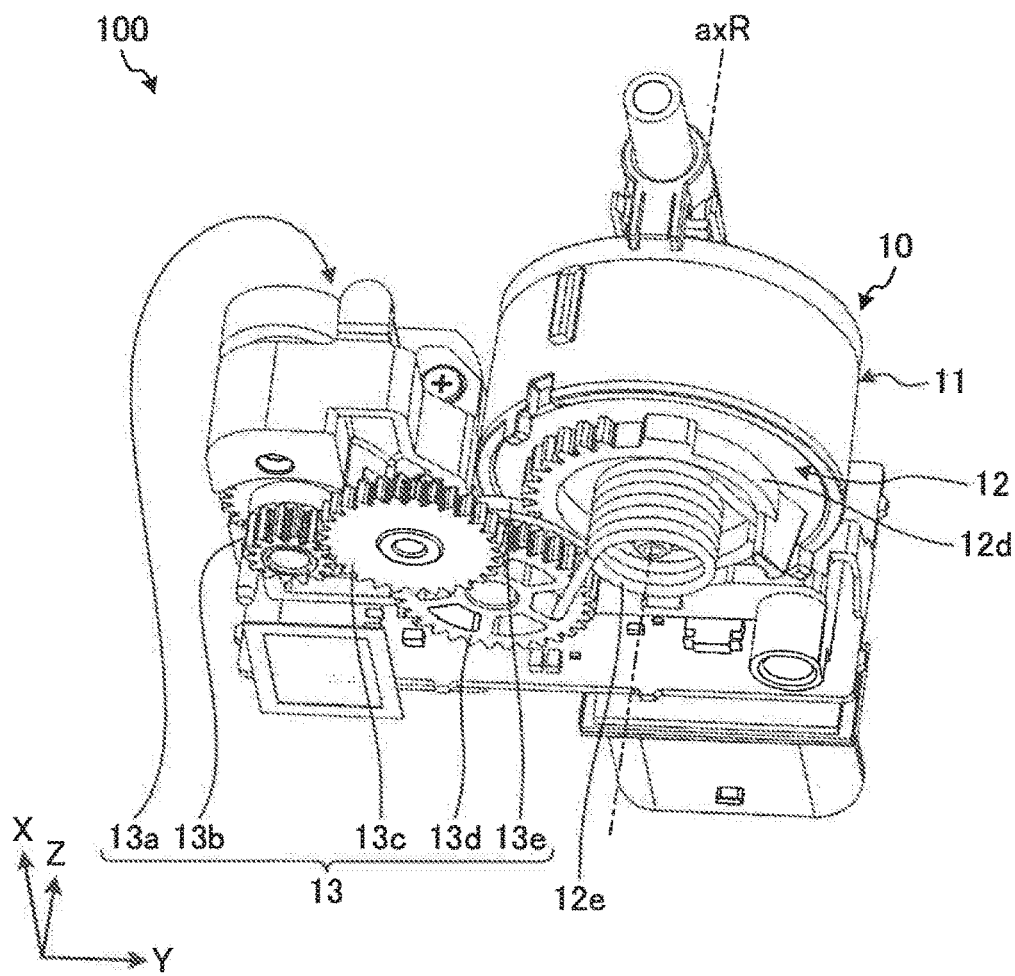
FIG. 3 is an operation explanatory diagram of a drive portion.

Next, the compressor 10 and the drive portion 13 will be described with reference to FIG. 2 and FIG. 3. FIG. 2 is an operation explanatory diagram of the compressor 10. FIG. 3 is an operation explanatory diagram of the drive portion 13.

As shown in FIG. 2, the compressor 10 has a cylinder 11, a cylinder wall 11a and a rotating body 12a. The cylinder 11 is, for example, cylindrically formed and has the cylinder wall 11a inside. The cylinder wall 11a separates space inside the cylinder 11.

The rotating body 12a has a flat plate shape and rotates inside the cylinder 11. As shown in FIG. 2, for example, the rotating body 12a rotates in a direction of separating from the cylinder wall 11a (in a counterclockwise direction in the drawing) by a driving force of a motor 13a described later. Thus, negative pressure is caused in the space between the cylinder wall 11a and the rotating body 12a, and the gas is drawn into the cylinder 11 from an intake hole (not shown).

When the rotating body 12a rotates to a predetermined position, the driving force of the motor 13a is released. Then, the rotating body 12a free from the driving force of the motor 13a rotates in a direction that the rotating body 12a approaches the cylinder wall 11a (in a clockwise direction in the drawing) by a spring force of a spring member 12e described later. Thus, the intake gas is compressed and exhausted from the output portion 5 (refer to FIG. 1).

Next, the drive portion 13 will be described with reference to FIG. 3. As shown in FIG. 3, the drive portion 13 includes the motor 13a, a first gear 13b, a second gear 13c, a third gear 13*d* and a front stage gear 13*e*. The compressor 10 includes a rotating portion 12 in addition to the cylinder wall 11*a* described above.

The rotating portion 12 has a driven gear 12*d* and the spring member 12*e*. The rotating body 12*a* of the rotating portion 12 is provided on an inner part side of the compressor 10. That is, the rotating body 12*a* rotates in conjunction with the rotating portion 12 so that intake or exhaust can be realized by the compressor 10.

As described above, since the compressor 10 is a rotary compressor, it is possible to make a configuration that saves space. Particularly, as described later, since the gas ejection apparatus 100 is provided in limited space such as an inner part of a back door of a vehicle 50 (refer to FIG. 4), downsizing of space occupied by the gas ejection apparatus 100 is required.

On the assumption that the compressor 10 compresses or exhausts the gas by reciprocation of a piston, when the compressor 10 takes in the gas, a shaft that interlocks with the piston protrudes from an outer periphery of the cylinder 11 so that it is necessary to secure a work area around the cylinder 11. Thus, the space occupied is increased.

The driven gear 12*d* is coaxially arranged on a rotating shaft axR, the rotating portion 12 rotates by torque that is applied to the driven gear 12*d*, and the above rotating body 12*a* rotates. The spring member 12*e* is provided so as to bias the rotating portion 12 in a direction opposite to a rotational direction of the rotating portion 12 by the motor.

The motor 13*a* is, for example, an electric motor and rotates or stops according to ON/OFF control by the controller 1. A rotational driving force of the motor 13*a* is transmitted to the first gear 13*b*. The motor 13*a* may be a hydraulic motor or other power sources may be used instead of the motor 13*a*.

The first gear 13*b* is connected to the second gear 13*c*. The second gear 13*c* is connected to the third gear 13*d*. The front stage gear 13*e* is coaxially arranged on the third gear 13*d* so as to be engaged with the driven gear 12*d* of the rotating portion 12. That is, the rotational driving force by the motor 13*a* is transmitted to the rotating portion 12 via the first gear 13*b*, the second gear 13*c*, the third gear 13*d* and the front stage gear 13*e*. Each of the driven gear 12*d*, the first gear 13*b*, the second gear 13*c*, the third gear 13*d* and the front stage gear 13*e* is one example of a gear.

As described above, the compressor 10 takes in the gas by the rotational driving force of the motor 13*a* and exhausts the gas by the spring force which biases the rotating portion 12 in a direction opposite to an intake direction. Therefore, intake and exhaust are switched by rotation in one direction.

That is, in the gas ejection apparatus 100, a rotational direction of the motor 13*a* is fixed and the intake or exhaust can be performed only with the ON/OFF control. If the intake and exhaust are switched by forward and backward rotation of the motor 13*a*, complicated motor control may be required.

On the other hand, in this embodiment, the rotational direction of the motor 13*a* is fixed in one direction so that the intake or exhaust can be achieved. Thus, the intake or exhaust can be performed with simple control. A number of gears and a method of engagement which are used for the gas ejection apparatus 100 are not limited to examples shown in figures.

Figure 4:
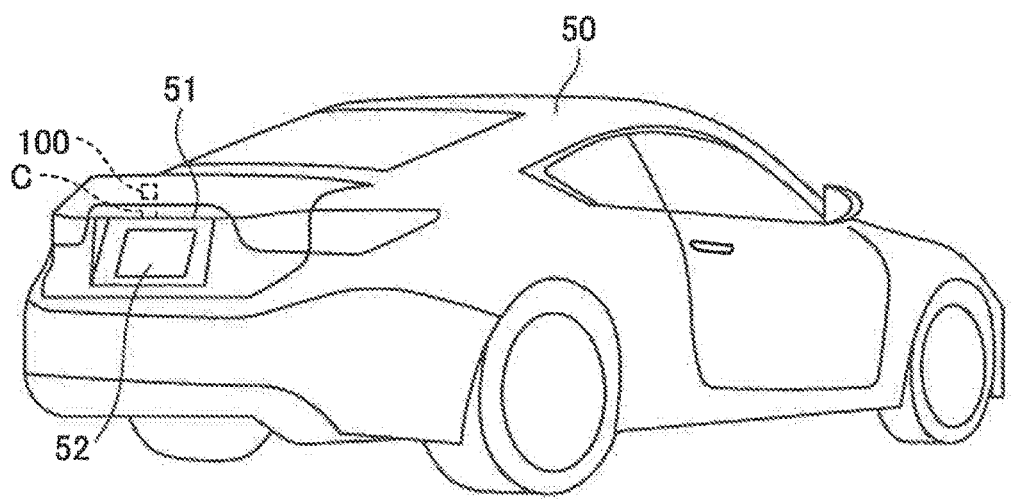
FIG. 4 is a diagram illustrating an installation position of the gas ejection apparatus.
Figure 5:
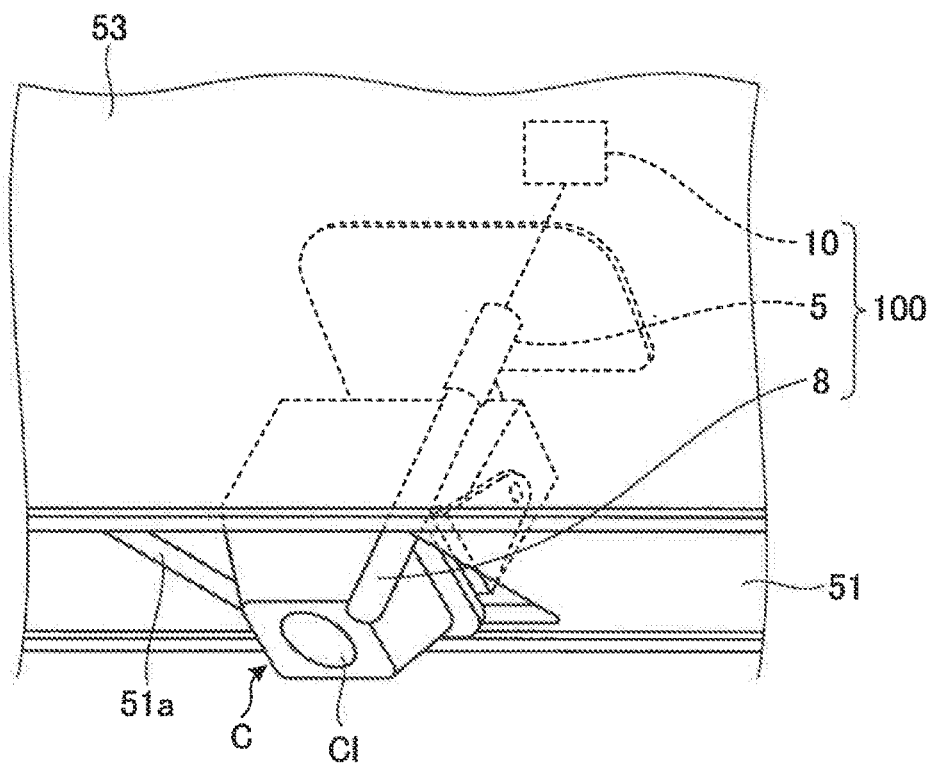
FIG. 5 is an enlarged view of a vicinity of a camera.

Next, an installation position of the gas ejection apparatus 100 will be described with reference to FIG. 4 and FIG. 5. FIG. 4 is a diagram illustrating the installation position of the gas ejection apparatus 100. FIG. 5 is an enlarged view of a vicinity of the camera C.

As shown in FIG. 4, the gas ejection apparatus 100 and the camera C are installed on a rear portion of the vehicle 50 above a license plate 52 and in a substantial center in a left-right direction of the vehicle 50.

More specifically, as shown in FIG. 5, a garnish 51 is provided to a vehicle back panel 53 and the camera C is placed in space between the vehicle back panel 53 and the garnish 51.

The camera C is placed so that a lens C1 is exposed outward from an opening 51*a* provided in the garnish 51. The gas compressed by the compressor 10 of the gas ejection apparatus 100 is supplied to a nozzle 8 via the output portion 5. Then, the gas is ejected from the nozzle 8 onto a central part of the lens C1 of the camera C.

Here, as shown in FIG. 5, the nozzle 8 is placed above the lens C1 in a front view of the lens C1. In other words, the nozzle 8 is placed outside an image capturing range of the camera C. Thus, an event that the nozzle 8 appears in an image captured by the camera C can be suppressed.

Figure 6:
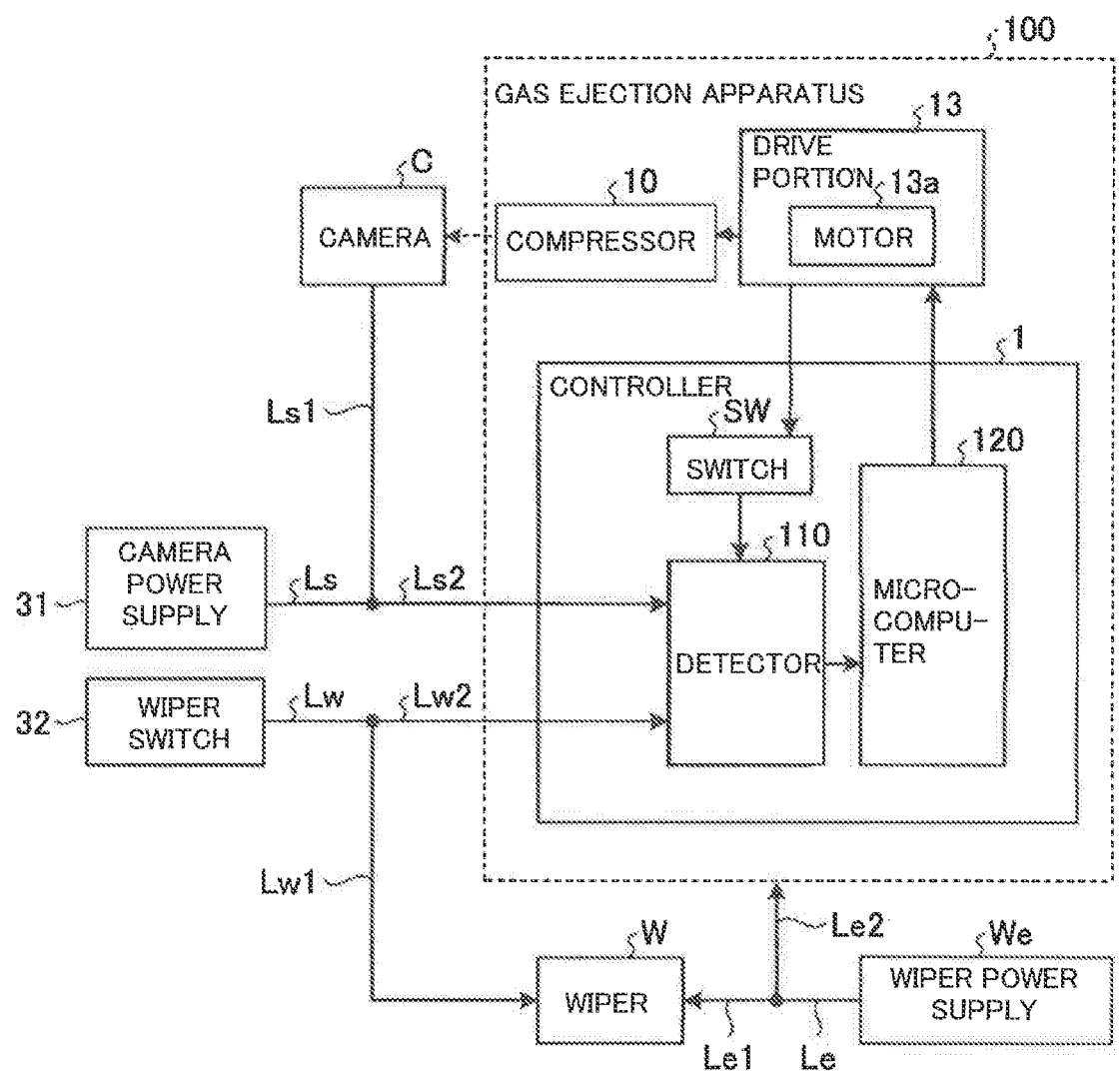
FIG. 6 is a block diagram of the gas ejection apparatus.

Next, a configuration example of the gas ejection apparatus 100 will be described with reference to FIG. 6. FIG. 6 is a block diagram of the gas ejection apparatus 100. FIG. 6 also shows the drive portion 13, the camera C, a camera power supply 31 and the like.

The camera C is, for example, a rear camera which is provided on a rear portion of the vehicle 50, as already described in FIG. 4. The camera C is, for example, activated based on an activation signal which is supplied from the camera power supply 31 when a shift lever of the vehicle 50 is reversed.

When the shift lever is reversed, a reverse signal is input to a display portion (not shown) of the vehicle 50. Thus, an output source of the display portion is switched from an AVN (Audio Visual Navigation (a registered trademark)) such as a navigation apparatus and an audio apparatus to the camera C.

The camera C captures an image of an area behind the vehicle 50 in a period in which the activation signal is supplied and outputs the captured image to the display portion. Thus, a driver of the vehicle 50 can check the image of the area behind the vehicle 50 when the driver moves the vehicle 50 backward.

Power is supplied from a battery of the vehicle 50 to the camera power supply 31 in conjunction with an ACC power supply of the vehicle 50. For example, when the ACC power supply is turned ON, the AVN of the vehicle 50 is activated, the activation signal is input from the camera power supply 31 to the camera C and an operation check of the camera C is performed.

At this time, the controller 1 can detect that the ACC power supply of the vehicle 50 is turned ON by detecting the activation signal. That is, the controller 1 can detect that the ACC power supply of the vehicle 50 is turned ON based on an initial activation signal. Instead of the activation signal, a signal showing that the ACC power supply is turned ON/OFF may be separately input to the controller 1.

A wiper switch 32 is a switch that switches between ON and OFF of a wiper W of the vehicle 50. When the wiper switch 32 is turned ON by the driver, an operation signal that operates the wiper W is output to the wiper W.

The wiper W, for example, receives the above described operation signal and performs removing operation of water drops and the like attached to a rear window. The wiper W is operated by power that is supplied from a wiper power supply We. For example, the wiper power supply We supplies power to the wiper W in conjunction with an IG power supply of the vehicle 50.

Here, the gas ejection apparatus 100 is, for example, installed to the vehicle 50 as an option product. Therefore, easy installation as well as versatility to various vehicles is required for the gas ejection apparatus 100.

Therefore, the gas ejection apparatus 100 can be operated by using wires which are arranged at a manufacturing stage of the vehicle 50 for the back door on which the camera C is installed. That is, when installing the gas ejection apparatus 100, there is no need for a new wiring work.

Specifically, the gas ejection apparatus 100 can be operated by power that is supplied from the wiper power supply We via a branched power supply line Le2 branched from a power supply wire Le. That is, the gas ejection apparatus 100 is switched between ON and OFF in conjunction with the IG power supply. Another branched power supply line Le1 branched from the power supply wire Le is used for supplying power from the wiper power supply We to the Wiper W.

A branched camera wire Ls2 and a branched wiper wire Lw2, which are respectively branched from a camera wire Ls and a wiper wire Lw that are provided in the inner part of the back door, are connected from the camera power supply 31 and the wiper switch 32 to the gas ejection apparatus 100. The gas ejection apparatus 100 can eject the gas by being triggered by a signal flowing to the branched camera wire Ls2 or the branched wiper wire Lw2.

Another branched camera wire Ls1 branched from the camera wire Ls is used for transmitting the activation signal from the camera power supply 31 to the camera C. Another branched wiper wire Lw1 branched from the wiper wire Lw is used for transmitting the operation signal from the wiper switch 32 to the wiper W.

Here, each of the power supply wire Le, the camera wire Ls and the wiper wire Lw is a wire that is arranged in the inner part of the back door at the manufacturing stage of the vehicle 50. Therefore, each of the wires is branched and connected to the gas ejection apparatus 100 so that it is possible to install the gas ejection apparatus 100.

That is, since the gas ejection apparatus 100 is operated by using wires arranged beforehand in the inner part of the back door, there is no need for a new wiring work. Thus, it is possible to make the installation of the gas ejection apparatus 100 easier and suppress installation cost.

The controller 1 includes a detector 110, a control portion 120 and a switch SW. The detector 110 detects the signal flowing to the branched camera wire Ls2 or the branched wiper wire Lw2. For example, the detector 110 detects the activation signal for the camera C that flows to the branched camera wire Ls2 and the operation signal that flows to the branched wiper wire Lw2.

When the detector 110 detects the activation signal, the detector 110 notifies the control portion 120 of a number of times of ejection according to the activation signal (e.g., two times). Thus, the control portion 120 controls the drive portion 13 so that the compressor 10 ejects the gas in the number of times of ejection.

Here, as described above, the activation signal is a signal that flows when the shift lever is reversed, namely, when the vehicle 50 moves back. Thus, the controller 1 detects the activation signal and allows the compressor 10 to eject the gas so that it is possible to remove attached substances from the lens of the camera C in accordance with a timing at which the camera C is activated. That is, the detector 110 can detect the activation signal as an ejection instruction for the compressor 10.

As a result, it is possible to provide an image in a state in which attached substances are removed to a user. Since the controller 1 removes attached substances from the lens of the camera C in accordance with the timing at which the camera C is activated, the user can omit additional operation such as switch operation.

At this time, it is preferable that the controller 1 detect initial rise of the activation signal and allow the compressor 10 to eject the gas. Thus, it is possible to remove attached substances from the lens of the camera C as soon as possible.

The detector 110 also detects the operation signal of the wiper W that flows to the branched wiper wire Lw2. For example, when the detector 110 detects the operation signal in a period in which the detector 110 is detecting the activation signal, the detector 110 notifies the control portion 120 of the number of times of ejection based on the operation signal (e.g., one time).

That is, in the gas ejection apparatus 100, when the user wishes to remove attached substances after checking the image captured by the camera C, the user can perform additional removing operation by operating the wiper switch 32. In other words, the gas ejection apparatus 100 can also detect the operation signal as the ejection instruction in addition to the activation signal.

At this time, the gas ejection apparatus 100 allows the compressor 10 to eject the gas when the gas ejection apparatus 100 detects the operation signal in a period in which the camera C is being activated, that is, the gas ejection apparatus 100 is detecting the activation signal. This is because gas ejection is not effective when the camera C is not being activated. That is, it is possible to suppress unnecessary removing operation by regarding only the operation signal detected in a period in which the camera C is being activated as effective.

The detector 110 according to this embodiment detects a position of the rotating body 12a inside the cylinder 11 shown in FIG. 2 based on positions of gears (the driven gear 12d, the first gear 13b, the second gear 13c, the third gear 13d and the front stage gear 13e) which are engaged with the rotating body 12a. Specifically, the detector 110 can detect the position of the rotating body 12a based on a signal that is input from the switch SW.

Figure 7:
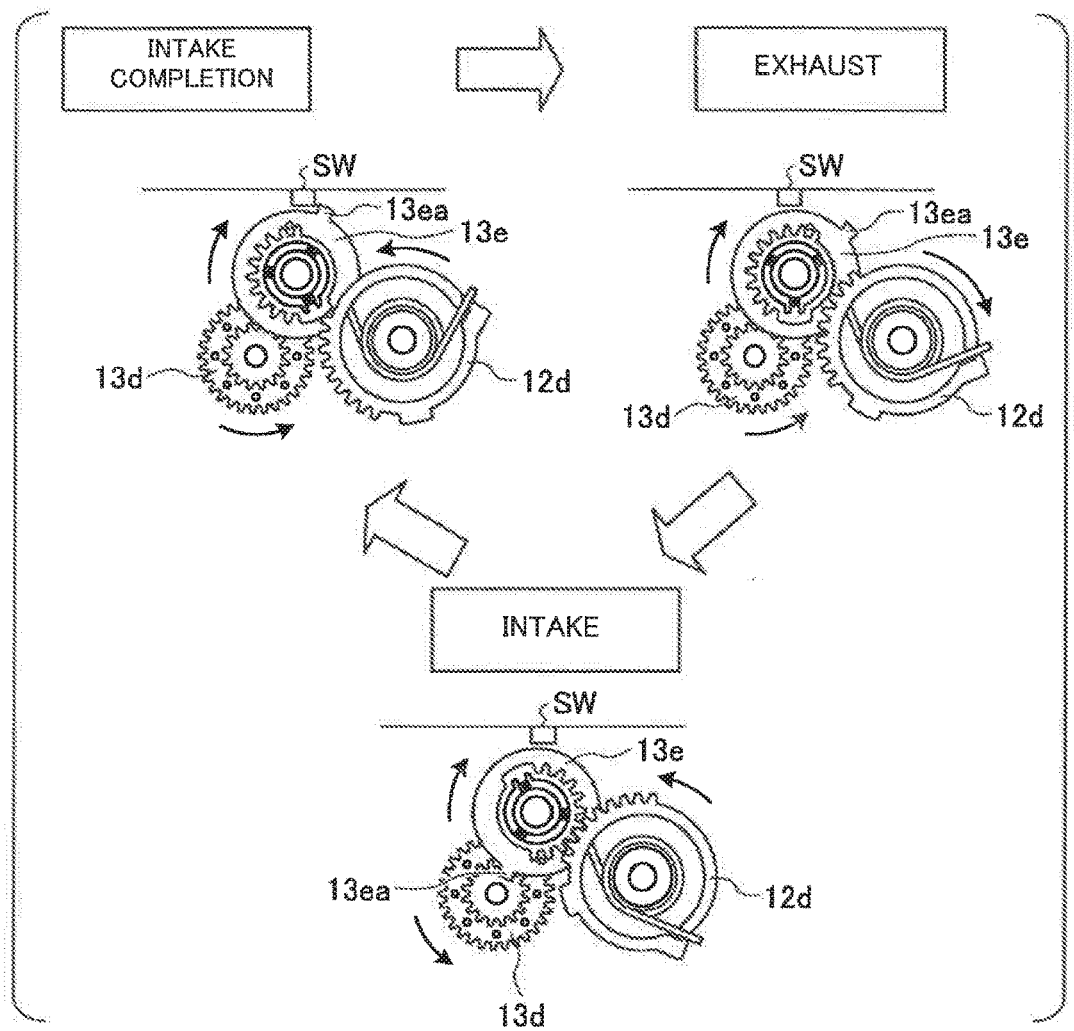
FIG. 7 is a diagram illustrating a specific example of a switch.

FIG. 7 is a diagram that explains the switch SW. FIG. 7 shows the minimum configuration (the third gear 13d, the front stage gear 13e and the driven gear 12d) related to operation of the switch SW for easier explanation.

As shown in FIG. 7, the switch SW is placed in a vicinity of the front stage gear 13e. The front stage gear 13e is provided with a protrusion 13ea that protrudes in a circumferential direction of the front stage gear 13e. When the front stage gear 13e rotates, the protrusion 13ea abuts on the switch SW and holds the switch SW down. Here, a case in which the protrusion 13ea that abuts on the switch SW is provided on the front stage gear 13e is described. However, the protrusion 13ea may be provided on another gear.

For example, as shown in FIG. 7, in a state in which the intake of the compressor 10 is completed (i.e., an intake completion state), the protrusion 13ea is placed in a position immediately after moving away from the switch SW. That is, the detector 110 can detect the intake completion state by detecting that the switch SW is moved from ON to OFF.

Here, the reason why the controller 1 detects the intake completion state by detecting that the switch SW is moved from ON to OFF is to prevent abrasion of the switch SW. If a state in which the switch SW is turned ON is set as the intake completion state, the compressor 10 waits in a state in which the switch SW is pressed.

Thus, a pressing force is applied on the switch SW for a long time, and spring fatigue of the switch SW accelerates the abrasion of the switch SW. That is, the controller 1 detects the intake completion state by detecting that the switch SW is moved from ON to OFF so that it is possible to improve durability of the switch SW. In the gas ejection apparatus 100, the state in which the switch SW is turned ON may be set as the intake completion state.

The front stage gear 13e has a toothless portion in an area in which the front stage gear 13e is engaged with the driven gear 12d. Thus, when the front stage gear 13e is rotated from the intake completion state, a rotational driving force of the front stage gear 13e is not transmitted to the driven gear 12d in a section of the toothless portion.

That is, in the section of the toothless portion, the driven gear 12d is free from the rotational driving force of the motor 13a and rotates in an opposite direction by a biasing force by the spring member 12e. Thus, the driven gear 12d rotates in a direction opposite to the rotational direction of the motor 13a and the compressor 10 is moved from the intake completion state to an exhaust state.

Then, teeth of the front stage gear 13e are again engaged with teeth of the driven gear 12d and the rotational driving force of the motor 13a is again transmitted to the driven gear 12d. Thus, the compressor 10 is moved from the exhaust state to an intake state.

The front stage gear 13e further rotates and the protrusion 13ea abuts on the switch SW. After that, a position in which the protrusion 13ea is separated from the switch SW is set as the intake completion state.

The controller 1 normally detects the intake completion state of the compressor 10 when the switch SW is moved from ON to OFF, and stops the motor 13a in the intake completion state. That is, the controller 1 normally causes the compressor 10 to wait in the intake completion state. Thus, when the gas ejection apparatus 100 receives a next ejection instruction, it is possible to eject the gas immediately.

The controller 1 does not always stop the compressor 10 in the intake completion state. For example, when the IG power supply of the vehicle 50 stops in the exhaust state or the intake state, supply of power to the gas ejection apparatus 100 stops.

Therefore in some cases, the compressor 10 stops in the intake state or the exhaust state.

In this case, when the IG power supply is restarted, the compressor 10 is stopped in a previous state. Then, it is impossible to immediately eject the gas at a desired timing. That is, in such a case, the compressor 10 needs to eject the gas after once passing through the intake completion state. Thus, in the gas ejection apparatus 100, a time loss occurs during passing through the intake completion state.

Therefore, the controller 1 according to this embodiment detects an intake/exhaust state of the compressor 10 at a time of activation, and controls the compressor 10 until the intake completion state occurs. This point will be described later in detail with reference to FIG. 8.

Here, the gas ejection apparatus 100 according to this embodiment can also allow the compressor 10 to eject the gas one time when a power supply of the gas ejection apparatus 100 is activated (i.e., when the IG power supply is turned ON). Thus, for example, it is possible to remove attached substances attached to the lens C1 of the camera C when the vehicle 50 stops. In other words, the gas ejection apparatus 100 can obtain information that the IG power supply is turned ON as the ejection instruction from outside.

Again, returning to FIG. 6, the control portion 120 will be described. When the control portion 120 receives the ejection instruction from outside, the control portion 120 controls the intake or exhaust of the compressor 10 according to detection results of the detector 110.

Figure 8:
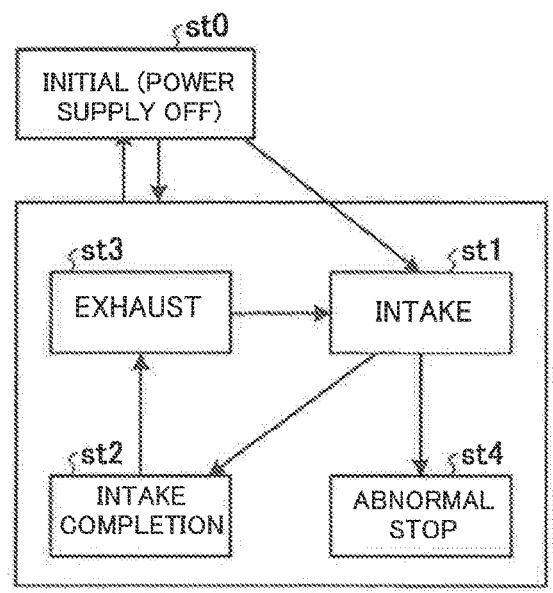
FIG. 8 is a state transition diagram of the compressor.

Here, a specific example of a control process by the control portion 120 will be described with reference to FIG. 8. FIG. 8 is a state transition diagram of the compressor 10.

An "initial state st0" shown in FIG. 8 is, for example, a state in which the IG power supply is turned OFF. For example, when the IG power supply is turned ON, the "initial state st0" moves to an "intake state st1", an "intake completion state st2" and an "exhaust state st3" according to the intake/exhaust state of the compressor 10. In addition, when the IG power supply is turned OFF again, the compressor 10 is moved to the "initial state st0".

When the "initial state st0" moves to the "exhaust state st3", the control portion 120 controls the compressor 10 to be moved to the "intake completion state st2" after passing through the "intake state st1".

Thus, the compressor 10 waits in the "intake completion state st2" in preparation for the next ejection instruction (the activation signal or the operation signal). Therefore, when the control portion 120 detects the next ejection instruction, the control portion 120 can allow the compressor 10 to eject the gas immediately.

Here, as described above, since the detector 110 detects the intake/exhaust state based on a state in which the switch SW is turned ON/OFF, the detector 110 cannot detect the intake/exhaust state of a destination to which the compressor 10 is moved from the "initial state st0".

Thus, even if a state of the destination to which the compressor 10 is moved from the "initial state st0" is the "intake completion state st2", the control portion 120 controls the compressor 10 to be moved to the "intake completion state st2" after once passing through the "exhaust state st3" and the "intake state st1".

In other words, even if the compressor 10 is in the intake state, the control portion 120 controls the compressor 10 to exhaust the gas once and to be moved to the "intake completion state st2". Thus, the control portion 120 can cause the compressor 10 to wait in the "intake completion state st2" in which the intake rate is the highest. As a result, the gas ejection apparatus 100 can allow the compressor 10 to eject the gas at the maximum efficiency when detecting the next ejection instruction.

The control portion 120 can also determine abnormality related to the compressor 10. Specifically, the control portion 120 starts the rotation of the motor 13a (refer to FIG. 6) and determines the abnormality when the compressor 10 is not moved to the "intake completion state st2" within a predetermined time (e.g., three seconds).

For example, when the control portion 120 determines the abnormality, the control portion 120 causes the compressor 10 to move to an "abnormal stop state st4". The control portion 120, in the "abnormal stop state st4", stops the compressor 10, that is, the drive portion 13 until the compressor 10 is restarted. It is considered that noise may be superimposed on a signal wire from the control portion 120 to the motor 13a and a signal wire from the switch SW to the detector 110 as a cause of the "abnormal stop state st4".

In this case, the noise may be continuously superimposed on the signal wires until the control portion 120, the camera C and the like are restarted. If the control portion 120 has determined the abnormality but repeated control of the compressor 10, the control portion 120 may be repeatedly affected by such noise.

Therefore, the control portion 120 stops the compressor 10 until the compressor 10 is restarted so that the control portion 120 can be saved from being affected by such noise.

If the control portion 120, for example, detects the abnormality related to the compressor 10 again after the compressor 10 has restarted, the control portion 120 may determine that the rotating portion 12 or the drive portion 13 is out of order and output an alert.

Figure 9:
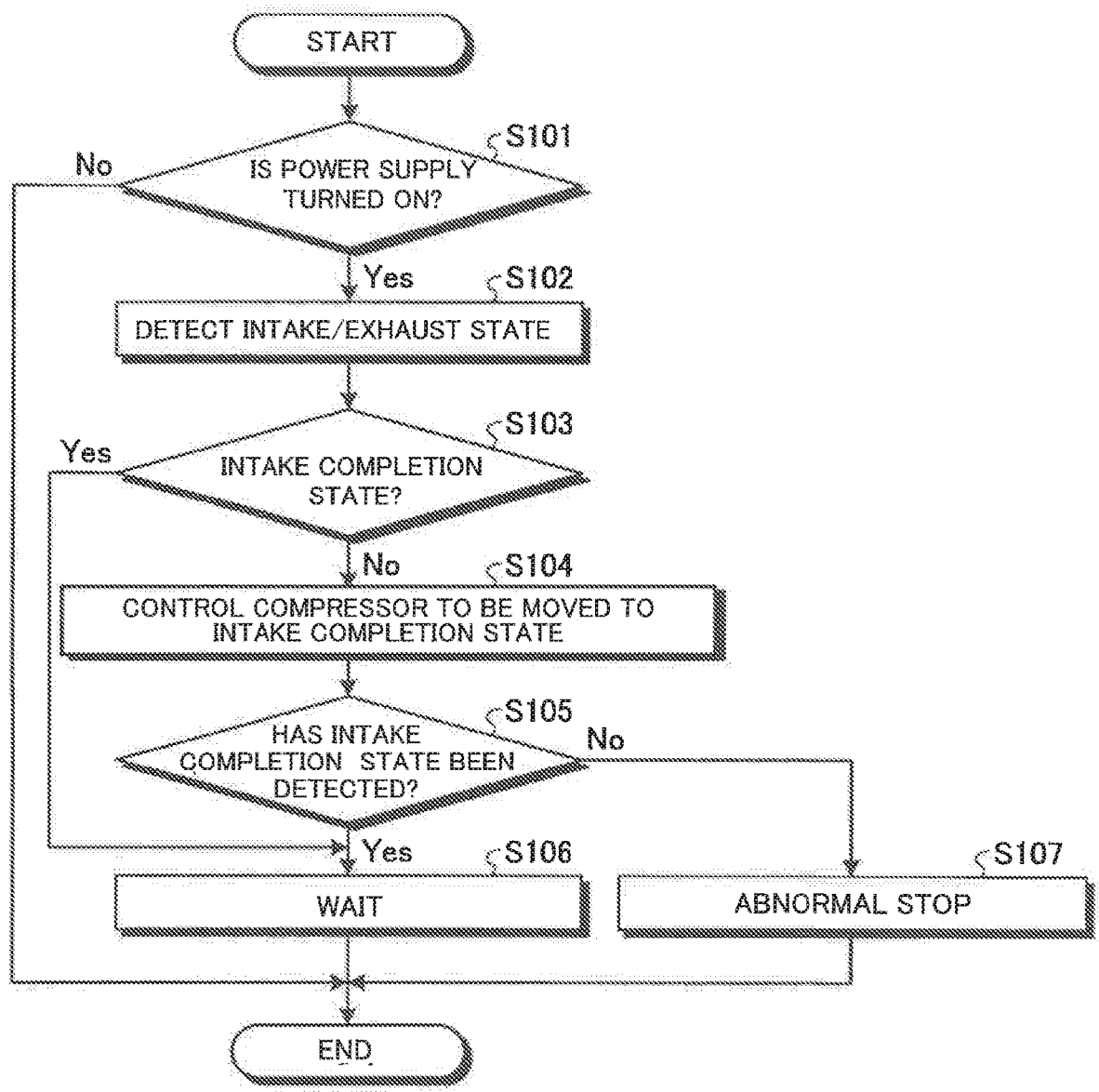
FIG. 9 is a flowchart illustrating steps of a process that is executed by the gas ejection apparatus.

Next, steps of a process that is executed by the controller 1 of the gas ejection apparatus 100 will be described with reference to FIG. 9. FIG. 9 is a flowchart illustrating steps of a process that is executed by the gas ejection apparatus 100.

As shown in FIG. 9, the controller 1 first determines whether or not the power supply of the compressor 10 is turned ON (i.e., the IG power supply is turned ON) (a step S101). Subsequently, when the power supply of the compressor 10 is turned ON (Yes in the step S101), the detector 110 detects the intake/exhaust state of the compressor 10 (a step S102). On the other hand, when the power supply of the compressor 10 is turned OFF (No in the step S101), the control portion 120 terminates the process.

Subsequently, the control portion 120 determines whether or not the intake/exhaust state is the intake completion state (a step S103). Here, when the intake/exhaust state is not the intake completion state (No in the step S103), the control portion 120 controls the compressor 10 to be moved to the intake completion state (a step S104). On the other hand, when the intake/exhaust state is the intake completion state (Yes in the step S103), the control portion 120 causes the compressor 10 to wait in the intake completion state (a step S106).

Subsequently, the control portion 120 determines whether or not the intake completion state has been detected within a predetermined time (a step S105). When the intake completion state has been detected (Yes in the step S105), the control portion 120 causes the compressor 10 to wait in the intake completion state (the step S106), and terminates the process.

On the other hand, when the intake completion state has not been detected within the predetermined time (No in the step S105), the control portion 120 brings the compressor 10 to an abnormal stop (a step S107), and terminates the process. The control portion 120 may perform an abnormality determination process in the step S105 not only at the time of activation but also at normal time.

As described above, the gas ejection apparatus 100 according to this embodiment ejects the gas using the compressor 10 that compresses the gas by the rotating body 12a inside the cylinder 11 and includes the detector 110 and the control portion 120. The detector 110 detects the position of the rotating body 12a inside the cylinder 11 based on the positions of the gears which are engaged with the rotating body 12a. When the control portion 120 receives the ejection instruction from outside, the control portion 120 controls the intake or exhaust of the compressor 10 according to the detection results of the detector 110. Therefore, according to the gas ejection apparatus 100 of this embodiment, it is possible to immediately eject the gas at the desired timing.

In the foregoing embodiment, a case in which the ejection target device is the camera C mounted on the vehicle 50 is described. However, the ejection target device is not limited to the camera C. That is, the ejection target device may be, for example, other device such as a security camera installed in the street.

In the forgoing embodiment, a case in which the detector 110 detects the intake/exhaust state of the compressor 10 based on the state in which the switch SW is turned ON/OFF is described. However, the invention is not limited thereto. That is, the detector 110 may detect the intake/exhaust state based on detection results of an optical sensor or the like. In a case where the switch SW is used, it is possible to reduce production cost of the gas ejection apparatus 100 compared to a case in which the optical sensor is used.

In the foregoing embodiment, a case in which the controller 1 is installed inside the gas ejection apparatus 100 is described. However, the invention is not limited thereto. That is, the controller 1 may be installed outside the gas ejection apparatus 100.

In the foregoing embodiment, a case in which the compressor 10 has the rotary gas compression mechanism is described. However, the compressor 10 may have a cylindrical gas compression mechanism.

While the invention has been shown and described in detail, the foregoing description is in all aspects illustrative and not restrictive. It is therefore understood that numerous other modifications and variations can be devised without departing from the scope of the invention.

What is claimed is:

1. A gas ejection apparatus that ejects gas using a compressor that compresses the gas by a rotating body inside a cylinder, the gas ejection apparatus comprising:
    a detector that detects a position of the rotating body inside the cylinder based on positions of gears which are coupled to the rotating body; and
    a microcomputer that controls intake and exhaust of the compressor according to detection results of the detector when receiving an ejection instruction,
    wherein the microcomputer is configured to cause the compressor to wait in an intake completion state upon completion of ejection of the gas that was performed in response to the ejection instruction.

2. The gas ejection apparatus according to claim 1, the microcomputer is configured to control the compressor to be moved to the intake completion state after passing through an exhaust state when the microcomputer receives the ejection instruction and the compressor is in an intake state.

3. The gas ejection apparatus according to claim 2,
    wherein the microcomputer is configured to determine that an abnormality has occurred when the rotating body has not been detected to reach the intake completion state within a predetermined time after the microcomputer controls the compressor to be moved to the intake completion state.

4. The gas ejection apparatus according to claim 3,
    wherein the microcomputer is configured to stop the compressor until the compressor is restarted when the microcomputer determines that the abnormality has occurred.

5. The gas ejection apparatus according to claim 1, further comprising
    a biasing member that biases the rotating body in a first rotary direction which is toward an exhaust state of the compressor; and
    a motor that applies a driving force in a second rotary direction that is opposite to the first rotary direction to cause the rotating body to be rotated toward the intake completion state.

6. The gas ejection apparatus according to claim 5, wherein
    the biasing member is a spring.

7. A gas ejection method for ejecting gas using a compressor that compresses the gas by a rotating body inside a cylinder, the method comprising the steps of:
    (a) a detector detecting a position of the rotating body inside the cylinder based on positions of gears which are coupled to the rotating body; and (b) a microcomputer controlling intake and exhaust of the compressor according to detection results of the step (a) when receiving an ejection instruction, wherein the step (b) causes the compressor to wait in an intake completion state upon completion of ejection of the gas that was performed in response to the ejection instruction.

8. The gas ejection method according to claim 7, wherein when the microcomputer receives the ejection instruction and the compressor is in an intake state, the microcomputer controls the compressor to be moved to the intake completion state after passing through an exhaust state.

9. The gas ejection method according to claim 8, wherein when the rotating body has not been detected to reach the intake completion state within a predetermined time after the microcomputer controls the compressor to be moved to the intake completion state, the microcomputer determines that an abnormality has occurred.

10. The gas ejection method according to claim 9, wherein when the microcomputer determines that the abnormality has occurred, the microcomputer stops the compressor until the compressor is restarted.

11. The gas ejection method according to claim 7, wherein a biasing member biases the rotating body in a first rotary direction which is toward an exhaust state of the compressor; and a motor applies a driving force in a second rotary direction that is opposite to the first rotary direction to cause the rotating body to be rotated toward the intake completion state.

12. The gas ejection method according to claim 11, wherein the biasing member is a spring.

\* \* \* \* \*